(12) United States Patent
Van Wagenen et al.

(10) Patent No.: US 9,648,083 B2
(45) Date of Patent: *May 9, 2017

(54) SCRIPTING SUPPORT FOR DATA IDENTIFIERS, VOICE RECOGNITION AND SPEECH IN A TELNET SESSION

(71) Applicant: Crimson Corporation, Dover, DE (US)

(72) Inventors: Lamar John Van Wagenen, South Jordan, UT (US); Brant David Thomsen, Sandy, UT (US); Scott Allen Caddes, Sandy, UT (US)

(73) Assignee: Crimson Corporation, Dover, DE (US)

( * ) Notice: Subject to any disclaimer, the term of this patent is extended or adjusted under 35 U.S.C. 154(b) by 296 days.

This patent is subject to a terminal disclaimer.

(21) Appl. No.: 14/190,959

(22) Filed: Feb. 26, 2014

(65) Prior Publication Data

US 2014/0237124 A1 Aug. 21, 2014

Related U.S. Application Data

(60) Continuation of application No. 13/467,673, filed on May 9, 2012, now Pat. No. 8,930,177, which is a
(Continued)

(51) Int. Cl.
*H04L 29/12* (2006.01)
*H04L 29/08* (2006.01)

(52) U.S. Cl.
CPC ............. *H04L 67/08* (2013.01); *H04L 67/14* (2013.01)

(58) Field of Classification Search
CPC .................................. H04L 67/08; H04L 67/14
See application file for complete search history.

(56) References Cited

U.S. PATENT DOCUMENTS 5,855,000 A 12/1998 Waibel et al.
6,049,602 A 4/2000 Foladare et al.
(Continued)

FOREIGN PATENT DOCUMENTS

AU 2008287331 A1 2/2009
CA 2380263 10/2003
(Continued)

OTHER PUBLICATIONS

Anonymous, "Newest UTF-8 TeraTerm Pro 4.45—Accessible, Free Serial, SSH and Telnet Terminal Emulator, Blind Access Journal", Sep. 16, 2006, http://blindaccessjournal.com/2006/09/newest-utf-8-teraterm-pro-4-45-accessible-free-serial-ssh-and-telnet-terminal-emulator/, (retrieved from the internet Nov. 3, 2015).
(Continued)

*Primary Examiner* — Jialong He

(57) ABSTRACT

Methods of adding data identifiers and speech/voice recognition functionality are disclosed. A telnet client runs one or more scripts that add data identifiers to data fields in a telnet session. The input data is inserted in the corresponding fields based on data identifiers. Scripts run only on the telnet client without modifications to the server applications. Further disclosed are methods for providing speech recognition and voice functionality to telnet clients. Portions of input data are converted to voice and played to the user. A user also may provide input to certain fields of the telnet session by using his voice. Scripts running on the telnet client convert the user's voice into text and is inserted to corresponding fields.

17 Claims, 4 Drawing Sheets

Related U.S. Application Data division of application No. 11/893,676, filed on Aug. 16, 2007, now Pat. No. 8,635,069.

(56) References Cited

U.S. PATENT DOCUMENTS

| | | | | |
|---|---|---|---|---|
| 6,226,361 | B1 | 5/2001 | Koyama | |
| 6,269,336 | B1 | 7/2001 | Ladd et al. | |
| 6,466,654 | B1* | 10/2002 | Cooper | G10L 15/26 379/88.01 |
| 6,587,820 | B2 | 7/2003 | Kosaka et al. | |
| 6,662,163 | B1 | 12/2003 | Albayrak et al. | |
| 6,976,227 | B2* | 12/2005 | Kunz | G06F 17/30905 707/E17.121 |
| 7,027,568 | B1 | 4/2006 | Simpson et al. | |
| 7,093,129 | B1 | 8/2006 | Gavagni et al. | |
| 7,912,726 | B2* | 3/2011 | Alshawi | G06F 17/2827 704/270.1 |
| 8,826,115 | B2* | 9/2014 | Raje | G06F 17/243 715/221 |
| 2001/0021246 | A1 | 9/2001 | Okajima et al. | |
| 2002/0002463 | A1* | 1/2002 | Kroeker | G06F 17/271 704/270.1 |
| 2003/0149745 | A1 | 8/2003 | Dunay et al. | |
| 2003/0156130 | A1 | 8/2003 | James et al. | |
| 2003/0226115 | A1* | 12/2003 | Wall | G06F 17/243 715/210 |
| 2004/0024842 | A1* | 2/2004 | Witt | G06F 17/243 709/219 |
| 2004/0267527 | A1 | 12/2004 | Creamer et al. | |
| 2005/0021886 | A1* | 1/2005 | Adema | G06F 15/16 710/33 |
| 2005/0071165 | A1 | 3/2005 | Hofstader et al. | |
| 2005/0137868 | A1 | 6/2005 | Epstein et al. | |
| 2005/0154775 | A1 | 7/2005 | McGinn et al. | |
| 2006/0069561 | A1 | 3/2006 | Beattie et al. | |
| 2006/0178886 | A1 | 8/2006 | Braho et al. | |
| 2007/0150278 | A1 | 6/2007 | Bates et al. | |
| 2008/0010655 | A1 | 1/2008 | Ellis et al. | |
| 2008/0294721 | A1 | 11/2008 | Berndt et al. | |
| 2009/0019313 | A1* | 1/2009 | Pokala | G06F 9/4443 714/37 |
| 2009/0048831 | A1* | 2/2009 | Van Wagenen | H04L 67/14 704/235 |

FOREIGN PATENT DOCUMENTS

| | | |
|---|---|---|
| CA | 2696551 A1 | 2/2009 |
| EP | 0 529 915 A2 | 3/1993 |
| EP | 2188970 A1 | 5/2010 |
| JP | A-H05-257849 A | 10/1993 |
| JP | 2001296991 | 10/2001 |
| JP | A-2004-029457 | 1/2004 |
| JP | A-2004-104762 A | 4/2004 |
| JP | A2005108087 | 4/2005 |
| JP | A-2006-127499 | 5/2006 |
| WO | 2009023261 A1 | 2/2009 |

OTHER PUBLICATIONS

International Search Report dated Dec. 1, 2008, for International Patent Application No. PCT/US2008/009756 filed Aug. 15, 2008.
Written Opinion dated Dec. 1, 2008, for International Patent Application No. PCT/US2008/009756 filed Aug. 15, 2008.
International Preliminary Report on Patentability dated Feb. 16, 2010, for International Patent Application No. PCT/US2008/009756 filed Aug. 15, 2008.
Wavelink, "Wavelink TelnetCE Client Scripting Reference Guide", [online], http://www.wavelink.com, published on Jul. 29, 2005.
"Speech Application Programming Interface", [online], retrieved from http://www.archive.org, archive date: Jul. 20, 2006.
"Wavelink TelnetCE client Users guide", [online], published on Aug. 5, 2005.
W. R. Stevens, "Telnet and Rlogin: Remote Login," TCPIIP Illustrated, vol. 1: The Protocols, 1994, chapter 26:389-418.
Tohru Asami, Internet RFC Dictionary: Request for Comments, 1st edition, ASCII, pp. 126-127, Nov. 1, 1998.

* cited by examiner

SCRIPTING SUPPORT FOR DATA IDENTIFIERS, VOICE RECOGNITION AND SPEECH IN A TELNET SESSION

The present application is a continuation of U.S. patent application Ser. No. 13/467,673, filed May 9, 2012, which is a divisional of U.S. Pat. No. 8,635,069, issued Jan. 21, 2014; the foregoing applications being incorporated herein by reference in their entirety.

FIELD OF INVENTION

This application relates to the design and implementation of user interfaces, including those for simple protocols like telnet.

BACKGROUND

A user interface is crucial for the productive use of a device. The need for carefully designed and preferably customizable user interfaces is well recognized. However, features that allow humans to best relate to information and to have information presented visually, with a layout that draws attention to the most important information and with additional tactile and audio effects are not readily implemented to support communication protocols such as telnet.

Terminal emulation (telnet) is traditionally a text-only medium. Support for sounds is limited to beeps, with custom efforts required to support any sounds more complex than that.

Most operators prefer receiving visual and sound information to merely being responsible for reading information exclusively as text. Further, being able to enter data by speaking to the computer will simplify, enhance and speed up the use of computers well beyond the current usage. One protocol that is still useful for inter-computer communications is the telnet protocol. While more secure protocols are possible, the simplicity of the telnet has managed to make it relevant despite its age and certain security related drawbacks.

The telnet protocol was introduced to provide a fairly general, bi-directional, eight-bit oriented communications facility. Primarily, it allows a standard method of interfacing between terminal devices and between processes. The protocol is often used for terminal-terminal communication and process-process communication (distributed computation). A telnet connection (or session) typically is a Transmission Control Protocol (TCP) connection carrying data with interspersed telnet control information. A series of communications called scripts are typically passed over a telnet connection as part of the data. The telnet Protocol also allows for a "Network Virtual Terminal" and negotiated options.

Upon establishing a telnet session, each end is assumed to originate and terminate at an imaginary "Network Virtual Terminal" providing a standard, network-wide, intermediate representation of a terminal. As a result there is no need for "server" and "user" or "client" hosts to track the characteristics of various terminals and terminal handling conventions. All telnet participants map their local device characteristics and conventions so as to appear to be dealing with an NVT over the network. Thus, each can assume a similar mapping by the other party.

The provision for negotiated options allows hosts to provide additional services over and above those available within a minimal NVT. Independent of, but structured within the telnet Protocol are various "options" that may be used with a "DO, DON'T, WILL, WON'T" structure to allow negotiations directed to permitting use of a more elaborate set of conventions for their telnet connection. Further, the terminal emulated may further enhance the user interface without affecting the other parties by adhering to the telnet protocol. Such options could include changing the character set, the echo mode, data security features, etc. The basic strategy for setting up the use of options is to have a party initiate a request that some option take effect if the option affects more than one party. The other party may then either accept or reject the request. If the request is accepted the option immediately takes effect.

A telnet session may be customized with a script. A script is a computer programming language that is interpreted (rather than requiring compilation) and can be typed directly from a keyboard. Unlike a script, commands in which are interpreted one at a time, programs are converted permanently into binary executables suitable for execution on a particular type of computer or processor. The chief benefit provided by a script is the reduction in the traditional edit-compile-link-run process. It should be noted that although scripting languages are interpreted, this does not exclude compilation. The significant ease in devising an interpreter over providing a compiler makes it easier to write interpreters for a scripting language.

Typically, each command in a script may be executed independently, resulting in stateless operation. In other words, once a scripting language command is executed, the processor can execute another command without having the already executed command affect the result. This almost natural property of a scripting language, however, can be modified to allow the ability to detect a state of interest. For instance a script supported by a telnet client may detect the text displayed on a screen, or even additional information not included in the telnet data stream. The information about a state may be embedded in the script data to allow retention of a state for some operations while executing the scripting language based routines in the customary manner. Additional commands may be provided to process and program embedded state information in such an implementation.

It should be noted that data within a script may have a peculiar structure requiring specially written code to handle the structure. Appropriately designed and deployed, scripts can help program applications, quickly automate repetitive tasks, and provide contextually relevant customization. Providing the appropriate scripts and implementations remain a challenge due to the complexity of a user interface and aspects of it that need customization.

Some terminal emulation types define "fields" that are used to submit information to the host. These are one or more regions of the screen set aside for user input. Because each field is defined independently, it can have different locations (on the screen), lengths, and unique flags to specify the type of data it expects. When the field information is supplied to the host, the location for the field is also included; the host can use this information to determine which field contained the data, and treat the data appropriately for that field.

It is also possible to identify fields by assigning them unique numbers or text strings. These numbers or text strings are referred to as "data identifiers." This allows useful behavior such as knowing which field to assign a scanned barcode to based on a data identifier embedded in the barcode.

These data identifiers are traditionally specified by the server and sent to the client over the terminal emulation session. This allows the server's programmer(s) to create and change them as needed. However, it is not uncommon to find companies unwilling or unable to update their server application(s) that have been in use for years. So far, in the context of warehouse inventory systems a hand-held telnet client has been a relatively unintelligent device. Many companies use inventory tracking systems and are at the same time are unable or unwilling to modify their server applications. Accordingly, there is a need for providing the data identifier and speech recognition and voice functionality to the inventory tracking systems by implementing this functionality on the telnet clients as oppose to the servers.

SUMMARY OF THE INVENTION

The embodiments of the present invention provide data identifiers functionality and speech and voice recognition functionality implemented with scripting at the telnet client, which, in the preferred embodiment, is a portable hand-held barcode scanner. In one aspect, one or more scripts running on the telnet client associate data identifiers with fields of the screens received by the telnet client from a server over a telnet session. The data identifiers may be assigned based on, for example, the names of the fields and other logic encoded in the scripts.

When the telnet client is used for scanning barcodes or acquiring other types of information, one or more scripts process the input data. After data has been processed, it is inserted in the corresponding fields based on the data identifiers that have been previously associated with those fields. After than, the data is sent to the server over the already established telnet session. In particular, a method of operating a telnet client comprising: receiving data from a server over a telnet session; detecting text displayable on a screen of the telnet client in the received data; and generating speech based on one or more of: (1) the detected text and (2) the state of the telnet session is disclosed.

In another aspect, the embodiments of the invention implement text-to-speech conversion in a telnet client by using scripts capable of detecting at least text or context of information displayed on a screen of a telnet connection. The scripts can also add information for text-to-speech conversion. Further scripting may be used to customize voice recognition in a user interface.

In some embodiments, one or more scripts running on the telnet client provide word lists that may be used to reduce the number of possible words and phrases into which text in a given telnet session may be converted and the number of possible words and phrases from which voice may be converted into text. Thus, only expected words and phrases are further interpreted for accuracy. When the interface with the user includes voice instructions, the computer converts text into intelligible speech by searching only through words in the allowed words and phrases list. While writing text into a data field, speech is matched to the list to select the words closest to the allowed words.

In some embodiments, speech recognition is provided in a telnet session by using a script capable of detecting the current cursor position within the telnet session and the context of the telnet session based on information displayed on the screen. This information may be combined with additional information for generating speech by the script. All this processing is performed by a telnet client, while the server applications remain unchanged.

In particular, a method of operating a telnet client comprising: receiving data from a server over a telnet session; detecting one or more input fields displayable on a screen of the telnet client in the received data; and associating one or more data identifiers with at least one detected input field is disclosed.

DESCRIPTION OF PREFERRED EMBODIMENTS

Embodiments of the present invention are best understood if explained in the context of an example. An illustrative example is a system for inventory tracking in a warehouse, department store, or a supermarket.

Figure 1:
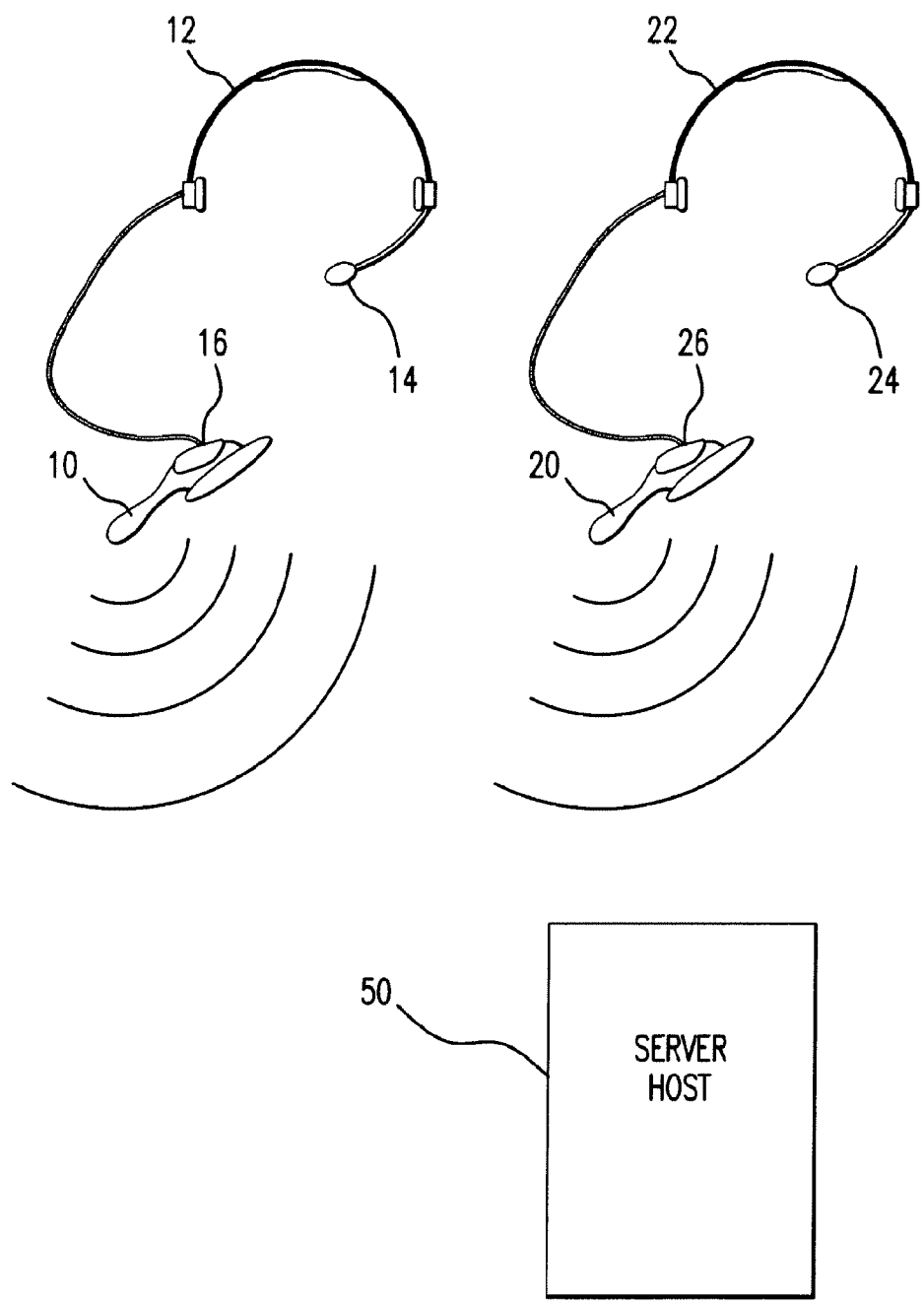
FIG. 1 illustrates a wireless network for inventory tracking in which telnet clients perform methods of the present invention.

FIG. 1 shows a wireless network setup for performing methods of the preferred embodiment. Server 50 (also called a host) hosts various software applications. One such application is a telnet host application. In some embodiments, server 50 hosts databases. In other embodiments, server 50 has access to databases over a wired or wireless network. These databases may contain inventory information and other information about customers, distributors, etc. that is typical for a given facility.

In the preferred embodiment server 50 has a wireless connection to a plurality of mobile telnet clients, such as for example telnet clients 10 and 20. The telnet clients are barcode scanners.

Figure 2:
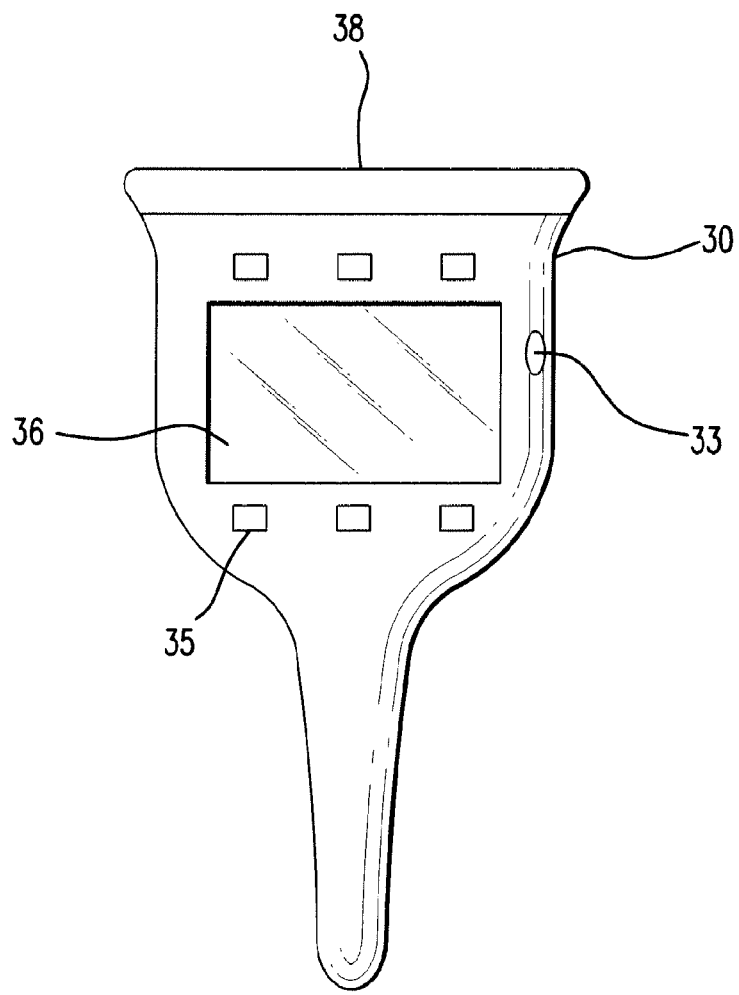
FIG. 2 illustrates a telnet client configured to perform methods of the present invention.

FIG. 2 shows a telnet client used in the preferred embodiment in greater detail. Telnet client 30 has optical scanning module 38 for scanning barcodes. Also, telnet client 30 has display 36 and inputs 35 that are generally known in the art. Telnet client 30 is also preferably equipped with headphones plug 33. Preferably, plug 33 is a standard ⅛ inch jack that supports headphones with a microphone. However, other audio input/output, which are well known in the art, may be used instead. For example, telnet client 30 may implement Bluetooth and support Bluetooth headphones.

Telnet client 30 is also equipped with a wireless transceiver (not shown in FIG. 2) for sending and receiving data over wireless medium from server 50.

In the preferred embodiment telnet clients are Wavelink's telnet clients, which starting with version 5.10 (first released in July 2005), have included support for scripting. These scripts are written by users in a custom programming language and allows specifying a unique behavior for the telnet client. Each script can be started in several different ways, depending on how it is to be used. Scripts also run independently of server 50, so no changes to the server are needed to support scripting.

In general, scripts enhance the functionality of a telnet client by performing processing of data received from server 50 before outputting it to the user and of the data inputted by the user before sending it to server 50. In the preferred embodiment, scripts have the ability to modify a text stream. In addition to the custom scripts, a telnet client may have other programs, such as for example a text-to-speech component and a speech-to-text component. Scripts allow data received from server 50 to be changed before it is sent to, for instance, the text-to-speech component, or to be modified after receiving it from the voice recognition component before passing it to the server or showing it to the user. Scripts can even use data from the voice recognition engine to initiate actions within itself (without querying the server), such as launching other scripts or displaying messages.

In a typical prior art inventory tracking system, a server is configured to receive a particular type of barcodes (also referred to as "symbology" in the art) from a barcode scanner. To use the barcode scanner for reading other types of barcodes, the server would have to be reconfigured. For example, if certain items in a warehouse have two barcodes of different types, server 50 would have to be initially configured to read the first type of barcodes, and then reconfigured to read the second type of barcodes. In some more advanced prior art inventory tracking systems, a server may be configured to receive both barcodes without the need for reconfiguration. The host program residing on server 50 may be configured to receive, for each item, a barcode of the first type followed by a barcode of the second type. Such system is not capable of receiving and properly processing scans of the two barcodes by the barcode scanner in a different order.

Figure 3:
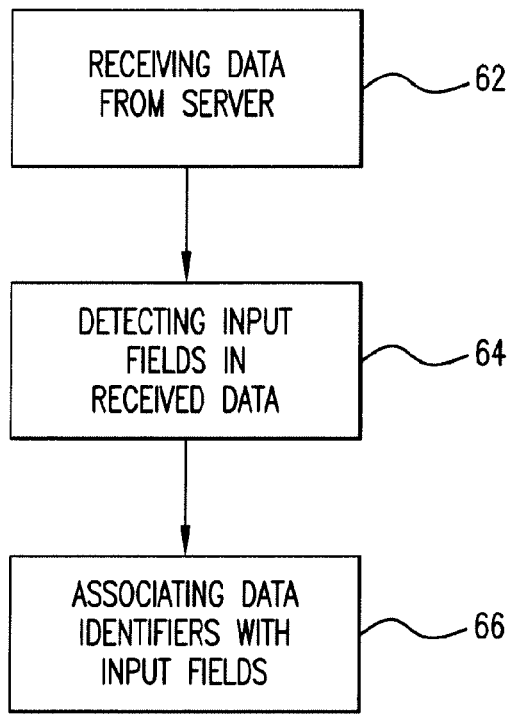
FIG. 3 is a block diagram of steps performed by a telnet client in connection with receiving data from a server and associating data identifiers with one or more fields in the displayable text.

In the preferred embodiment, scripts running on the telnet client have the ability to provide greater flexibility of utilizing the system by using data identifiers. FIG. 3 shows a block diagram of steps performed by a telnet client, such as for example telnet client 30 shown in FIG. 2, in connection with receiving data from server 50 and associating data identifiers with input fields. In step 62, telnet client 30 receives data from server 50. In step 64, one or more scripts running on the telnet client detect displayable text in the received data. In the preferred embodiment, the displayable text comprises one or more input fields that are displayed on the screen of the telnet client. In some embodiments, the displayable text may comprise other information. In step 66, the scripts running on the telnet client analyze the displayable text and add data identifiers to the input fields. Typically, data identifiers are assigned to input fields shown on the screen. A data identifier is simply a text string that is added to items of displayable text. Data identifiers may be displayable or not displayable on the screen of the telnet client. Data identifiers begin, end, or both, begin and end, with a sequences of special characters that are used to distinguish the data identifiers from other textual information and from each other. These sequences of special characters are used by scripts for locating and using data identifiers.

Figure 4:
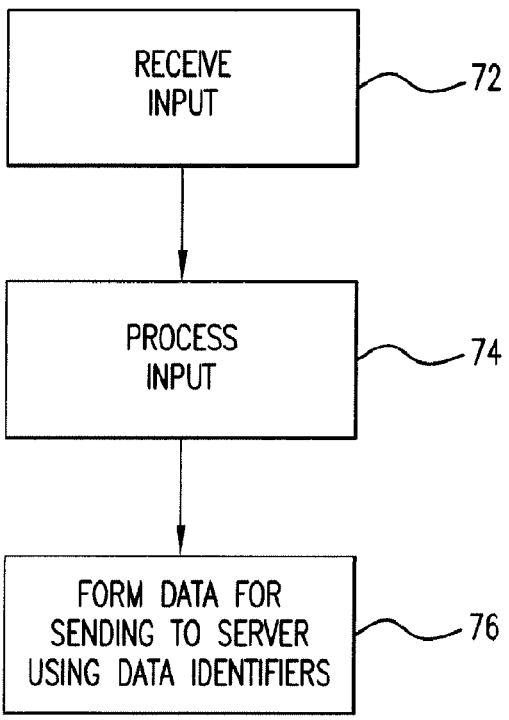
FIG. 4 is a block diagram of steps performed by a telnet client in connection with receiving input data after data identifiers have been assigned to one or more fields in the displayable text.

FIG. 4 shows a block diagram of steps performed by a telnet client after data identifiers have been assigned to one or more fields in the displayable text. In step 72, the telnet client receives input. In the preferred embodiment, input is a barcodes scan. However, it may be any other type of input such as a sequence of input buttons 35 presses, or a voice command received over headphone plug 33. In step 74, a script processes the input data. In the preferred embodiment, in step 74, the script may parse the input data, remove characters of input data, or add certain characters of input data. For example, the script may add the current date to the input data. Also, one or more scripts may determine the geographic location (such as a floor in a warehouse) of the telnet client and then append the identify of the geographic location to the barcodes scanned in that location. In other embodiments, other more complex operations may be implemented.

In step 76, one or more scripts running on the telnet client forms text messages for sending to the server over the telnet protocol. In forming the messages, the scripts insert processed data into fields identified by certain data identifier. For example, according to its logic, the script determines that a scanned barcode is of a certain type in step 74. In step 76, the same script, or another script, inserts this barcode to the field identified by a corresponding data identifier that was associated with the field previously in step 66 shown in FIG. 3. In addition to simply inserting processed input data in corresponding fields, scripts may manipulate data after it has been inserted. For example, scripts may insert dashes, periods, etc. for converting data in the desired format.

The operation of the preferred embodiments of the methods shown in FIGS. 3 and 4 is illustrated by the following example. Certain items in a warehouse have two barcodes, one is applied by the manufacturer and another applied by a distributor. A telnet client, such as telnet client 30, and server 50 have a telnet session established between them. The application running at the server is programmed to receive two barcodes for each item. The server sends to the telnet client a screen with two fields that the telnet client has to populate. In step 62, the telnet client receives the screen from the server. In step 64, one or more scripts running on the server determine the two fields that the server expects to be populated. In step 66, one or more scripts running on the telnet client associates data identifiers with the two fields.

In step 72, a user scans barcodes. As the barcodes are scanned one or more scripts running on the telnet client process the input scans, in step 74. In this example, the scripts simply determine the type of the scanned barcode. In step 76, after the type of the most recently scanned barcode has been determined, it is inserted in the field associated with a particular data identifier that matches its type. Unlike, the prior art systems, the sequence of two scans is irrelevant. Furthermore, applications running on the server did not have to be modified.

The following are some scripting commands that are useful for supporting data identifiers:
Get the number of fields on the screen;
Get/Set a field's position;
Get/Set a field's size;
Get/Set a field's flags/type;
Get/Set a field's data identifier value(s);
Get/Set a field's association with one or more particular symbologies (barcode types);
Get/Set additional barcode processing/manipulation when scanned barcode data is copied to a field; and
Support for multiple data identifiers assigned to a single field.

By allowing data identifiers to be specified in scripts, programmers can still take advantage of the flexibility of data identifiers without making changes to their server applications. In the preferred embodiment, the telnet client can be configured remotely (using software such as Wavelink's Avalanche manager). Having this capability allows automatic distribution of scripting updates to telnet clients for easy central control.

The following is a self-explanatory script excerpt that associates fields with data identifier and one or more symbologies and set a prefix of scans that are inserted in the second field to "B8." (Note that lines starting with "//" are comments.)

```
Script Example #1:
// Assign the first field (index 0) a symbology and data identifier.
Set_Field_Data_ID( 0, "ITEM1" )
Set_Field_Symbology_ID ( 0, "MSI" )
// Assign the second field (index 1) two symbologies and two data
identifiers.
Set_Field_Data_ID ( 1, "ITEM2" )
Set_Field_Symbology_ID ( 1, "UPCA" )
Set_Field_Symbology_ID ( 1, "CODABAR" )
// Have barcode data assigned to the second field always start with "B8"
Set_Field_Prefix_Scan_Data( 1, "B8" )
```

In another aspect of the preferred embodiment, text-to-speech is an add-on component that can take text and convert it to speech. It has the capability of working with raw text, and can also be given additional instructions (such as the current language and pronunciation guides) to improve the speech rendered. In the preferred embodiment, scripts have the ability to detect the current state of the telnet connection, including the text currently displayed on the screen. Scripts can also use additional information stored at the telnet client, or computed by the script itself, and which cannot be obtained from the telnet session. This combination makes the scripts useful for giving instructions and raw text to a text-to-speech component, and to have those voice instructions modified based on the current state of the telnet session.

Additionally, in the preferred embodiment voice recognition is an add-on component that can convert the input from a microphone into text. It supports additional instructions (such as lists of allowed words, and saved voice information for the current user) to increase the accuracy of the recognition.

In the preferred embodiment of the invention, voice recognition is supported by a telnet script running on a telnet client. The script determines allowed words or phrases, preferably based on one or more of the currently selected field, the current cursor position, and the text on the currently displayed page. Voice and speech recognition becomes more accurate with increasingly limited allowed set of words or phrases. In an exemplary embodiment, if the currently selected field is expecting barcode information, the voice recognition engine will avoid changing speech into invalid input and instead look for fits with valid digits and characters. This will help the voice recognition engine in, for example, distinguishing between "1" and "one."

Figure 5:
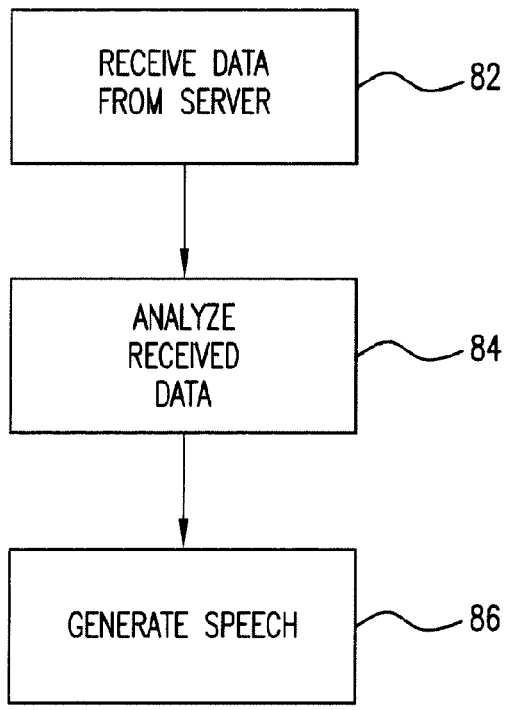
FIG. 5 is a block diagram of steps performed by a telnet client in connection with receiving data from a server and outputting voice based on this data.

FIG. 5 shows a block diagram of steps performed by a telnet client, such as for example telnet client 30 shown in FIG. 2, in connection with receiving data from server 50 and outputting voice based on this data. In step 82, telnet client 30 receives data from server 50. In step 84, one or more scripts running on the telnet client analyze the received data. Analyzing, or processing, data may involve many different operations. In the preferred embodiment, the scripts running on the telnet client are capable of detecting the following items in the received data: text displayable on the screen of the telnet client, one or more input fields displayable on the screen of the telnet client, the state of the telnet session, and the location of the cursor in the telnet session. In some embodiments, other information may also be detected. In step 86, the scripts running on the telnet client generate speech. In generating speech, the scripts process one or more of the items detected in step 84. Additionally, the scripts may consider prior user input when generating speech. The generated speech may take several forms. In particular, the speech may be an instruction to the user, a prompt for making an input, help information, a portion of the displayed text read to the user, and some information based on prior user input.

In one embodiment, the text is converted to voice by processing it with a text-to-voice package known in the art. The text converted into speech may be one or more items detected in step 84, such as a portion of the text displayed on the screen of the telnet client or one or more input fields. Also, the text converted into speech may be a predefined string, or a text that is based on prior user input. In another embodiment step 86 may be accomplished by referencing a hard coded recording based on the determined displayable text and outputting the recorded voice, without real-time text-to-voice conversion. In yet other embodiments, a combination of the two methods may be implemented. In particular, some parts of the audible message may be reproduced from a stored recording, while other parts of that message may be obtained by processing displayable text with a text-to-voice package.

Voice instructions may greatly improve the productivity of the user operating the telnet client. For example, instead of native telnet beeps, the user may be prompted of an error in scanning a barcode and asked to rescan. The user may also be prompted to scan the next barcode and in addition he may be supplied with helpful information, such as "please scan the manufacturer's barcode at the upper right hand corner of the box cover." As explained above, the information in this instruction may come from different sources. For example, the phrase "please scan the" may be a pre-recorded message invoked by the script, the phrase "manufacturer's barcode," may be an input field displayed on the screen of the telnet client, and the phrase "at the upper right hand corner of the box cover" may be speech converted from a pre-defined text string.

Figure 6:
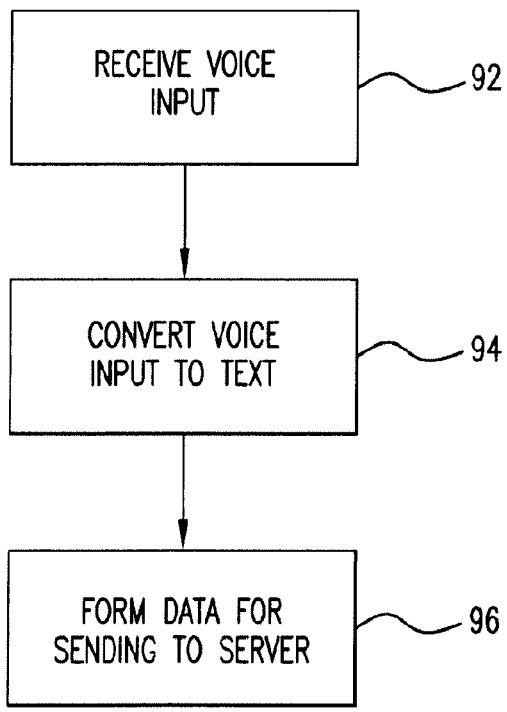
FIG. 6 is a block diagram of steps performed by a telnet client that support voice recognition.

FIG. 6 shows a block diagram of steps performed by a telnet client that support voice recognition. In step 92, the telnet client receives voice input. In step 94, a voice-to-text engine known in the art converts the voice input to text. In step 96, one or more scripts running on the telnet client forms text messages for sending to the server over the telnet protocol. Then, the text message is sent to the server.

The behavior of the scripts that convert speech into input text by passing the input voice to the voice-to-text engine may be modified by certain input parameters. These parameters may be derived from the text presently displayed on the screen of the telnet client, one or more input fields displayed on the screen of the input clients, the state of the telnet session and the location of the cursor. This allows a more precise, context sensitive, conversion of speech into text input.

A typical use of the voice recognition application is hands free operation of the user. For example, the user may be prompted to bring all items from a particular shelf in a warehouse and to input the number of items. In the prior art systems, barcodes of the items would have to be scanned, or alternatively, the number of items would have to be manually entered using inputs 35. Both ways require manual operations. In the preferred embodiment, the user may simply pronounce the number of items into microphone connected to the telnet client; the user's hands remain free for carrying items or performing other tasks. The telnet client receives voice information in step 92, converts it to text in step 94, and then forms a message for sending to the server over the telnet protocol in step 96. This allows for a completely hands free operation of some tasks, thus improving the productivity of the personnel.

Scripting allows limiting the universe of possibly voice responses and consequently a better voice recognition ratio. For example, if the universe of responses is limited to integers in the range 1-5, then the voice recognition package would look to match the closest number pronounced by the user among the five allowed options only. Also, as mentioned above, scripting allows to set the message sent to the server to the digit, instead of the word.

Script commands related to text-to-voice conversion and to speech recognition may be combined for implementing powerful applications. The following script example, provides the core commands required for implementing the examples in which the user is prompted to input the number of items.

Script Example #2

```
var String sResult
Speech_From_Text( "How many items?" )
// Return a string representing the numbers 1 to 5 spoken by the user.
sResult = Speech_To_Text( "1", "2", "3", "4", "5" )
Keypress_String( sResult )
Keypress_Key( "Enter" )
```

In the preferred embodiment, the login information is stored to keep track of the current user, and to tell the voice recognition component which user's saved voice information to use. Saved voice information improves the accuracy of the voice recognition for the user, because the voice recognition package may be trained according to methods known in the art. The following script example sets speech settings, and then prompts the user to login using his voice. After the user provides his credentials, another script responsible for logging in is called.

Script Example #3

```
var String sName
Speech_Setting( "Language", "English" )
Speech_Setting( "Voice", "Bob" )
// UserNames.txt includes the names of all company employees.
// It is used for Speech_To_Text( ).
Speech_Setting( "Convert_File", "C:\Safe\UserNames.txt" )
// NamePronounce.txt defines how to pronounce unusual names.
// It is used for Speeh_From_Text( ).
Speech_Setting( "Pronounce_File", "C:\Safe\NamePronounce.txt" )
Speech_From_Text( "Login Name?" )
sName = Speech_To_Text( )
Speech_To_Text( String_Combine( "Logging in as ", sName )
// Load the saved voice information (profile) for this user.
// Additional speech results performed later will be added to that profile.
Speech_Setting( "User_Profile", sName )
// Login is another script
call Login( sName )
```

The communication that occurs over a telnet session is continuous. When server receives the data it may sent data back to the telnet client. The client sends more data to the server, etc. Accordingly steps shown in FIGS. 3-6 may be repeated multiple times in a single telnet session.

It should be understood that script commands related to data identifiers, voice recognition, and speech can be combined in a single script or a set of scripts implementing a particular task. In some embodiments the names of the fields that are converted to speech may also be associated with data identifiers. Similarly, voice information provided by the user may be first converted to text and then processed with scripts related to text processing.

Notably, no server modifications are required for implementing the functionality related to data identifiers or the functionality related to speech and voice recognition.

The foregoing description of the embodiments of the present invention has been presented for purposes of illustration and description. It is not intended to be exhaustive nor to limit the invention to the precise form disclosed. Many modifications and variations will be apparent to those skilled in the art. The embodiments were chosen and described in order to best explain the principles of the invention and its practical applications, thereby enabling others skilled in the art to understand the invention. Various embodiments and modifications that are suited to a particular use are contemplated. It is intended that the scope of the invention be defined by the accompanying claims and their equivalents.

What is claimed:

1. A method implemented by a client, the method comprising:
    the client establishing a virtual terminal protocol session with a server, wherein the virtual terminal protocol session is a telnet session;
    the client receiving data from the server during the telnet session, wherein the client is running one or more scripts;
    the client detecting, in the data received from the server during the telnet session, displayable text data comprising one or more input fields;
    the client identifying the one or more input fields from the data received from the server during the telnet session;
    the client associating one or more data identifiers with a particular input field from among the one or more input fields;
    the client receiving input data;
    the client processing the input data, wherein the processing comprises parsing the input data and at least one of:
        adding a character to the input data; and
        removing a portion from the input data; and
    the client associating the processed input data with the particular input field based on the one or more data identifiers associated with the particular input field.

2. The method of claim 1, wherein the one or more data identifiers are associated with the particular input field based on information comprising at least one of:
    one or more rules specified by the client; and
    a name of the particular input field.

3. The method of claim 1, wherein the received input data comprises a barcode scan.

4. The method of claim 1, wherein the received input data comprises a voice command.

5. The method of claim 4, further comprising converting speech into text.

6. The method of claim 5, further comprising generating speech.

7. The method of claim 6, wherein the speech comprises at least one of: an instruction, a prompt, help information, a portion of text displayed on a screen of the client, and a prior user input.

8. A method implemented by a client, the method comprising:
    the client running a virtual terminal protocol session with a server, wherein the virtual terminal protocol session is a telnet session;

the client receiving data from the server during the telnet session;

the client running one or more scripts that cause the client to:

detect, in the data received from the server during the telnet session, displayable text data comprising one or more input fields;

identify the one or more input fields from the data received from the server during the telnet session;

associate one or more data identifiers with a particular input field from among the one or more input fields;

receiving input data;

processing the input data, wherein the processing comprises parsing the input data and at least one of:

adding a character to the input data; and removing a portion from the input data; and associating the input data with the particular input field based on the one or more data identifiers associated with the particular input field.

9. The method of claim 8, wherein the one or more scripts cause the client to analyze the displayable text data and add the one or more data identifiers to the particular input field.

10. The method of claim 9, wherein a first data identifier in the one or more data identifiers comprises at least one special character operable to distinguish the first data identifier from other types of data and from a second data identifier.

11. The method of claim 8, further comprising the client displaying the particular input field on a screen of the client.

12. The method of claim 8, wherein the input data comprises a barcode scan.

13. The method of claim 8, wherein the input data comprises one of:

a sequence of input button data; and a voice command.

14. The method of claim 8, further comprising adding a geographic location indicator to the input data.

15. The method of claim 8, further comprising generating speech.

16. The method of claim 15, wherein the speech comprises at least one of:

an instruction;

a prompt;

help information;

a portion of text displayed on a screen of the client; and information based on a prior user input.

17. The method of claim 8, wherein the one or more scripts also cause the client to add a current date to the input data.

* * * * *

UNITED STATES PATENT AND TRADEMARK OFFICE
CERTIFICATE OF CORRECTION

PATENT NO. : 9,648,083 B2  
APPLICATION NO. : 14/190959  
DATED : May 9, 2017  
INVENTOR(S) : Lamar John Van Wagenen et al.

It is certified that error appears in the above-identified patent and that said Letters Patent is hereby corrected as shown below:

In the Claims

Column 11, Line 17 (Claim 8, Line 22):
"associating the input data" should be --associating the processed input data--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*